Feb. 26, 1946.  C. EAMES  2,395,468
METHOD OF MAKING LAMINATED ARTICLES
Filed May 28, 1942  5 Sheets-Sheet 1
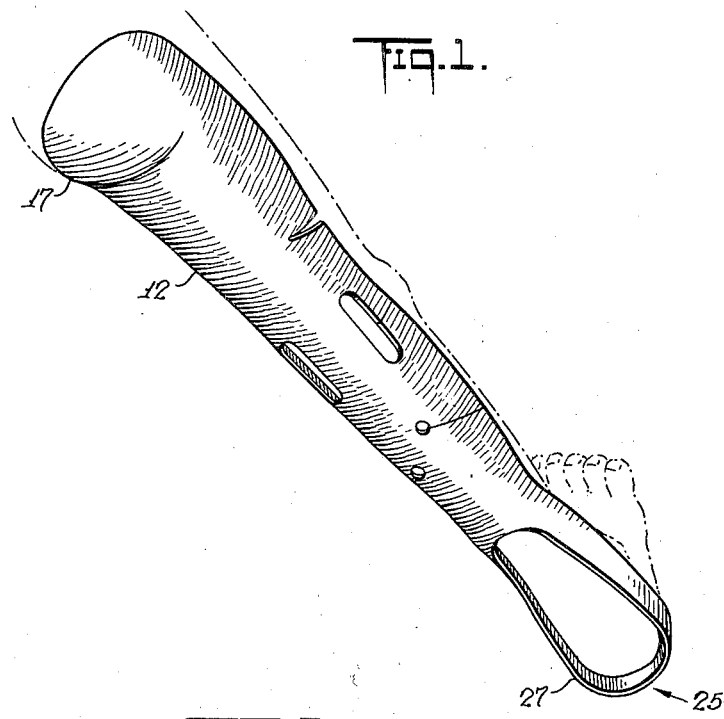
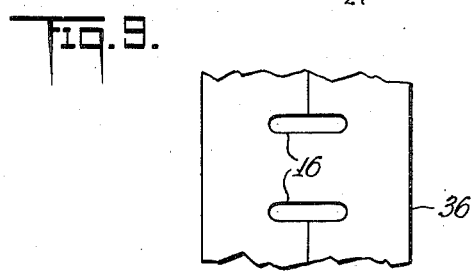
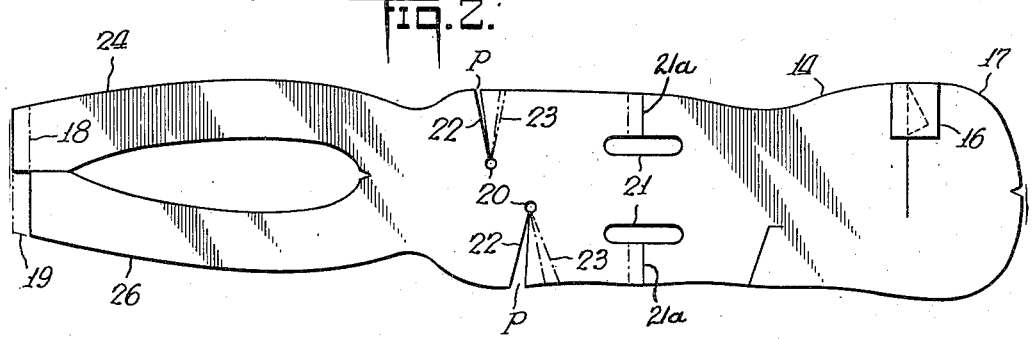
INVENTOR
*Charles Eames*
BY
*Blair, Curtis + Hayward*
ATTORNEYS Feb. 26, 1946.     C. EAMES     2,395,468
METHOD OF MAKING LAMINATED ARTICLES
Filed May 28, 1942     5 Sheets-Sheet 2
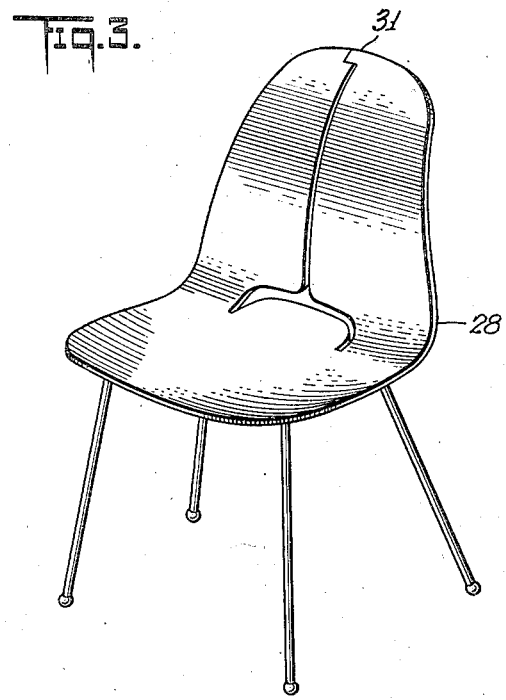
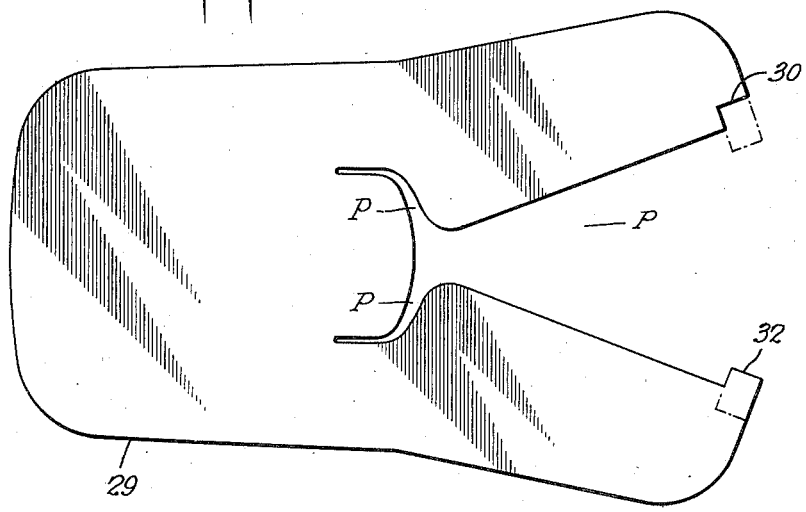
INVENTOR
Charles Eames
BY Blair, Curtis & Hayward
ATTORNEYS Feb. 26, 1946.  C. EAMES  2,395,468
METHOD OF MAKING LAMINATED ARTICLES
Filed May 28, 1942   5 Sheets-Sheet 3

INVENTOR
*Charles Eames*
BY
*Blair, Curtis & Hayward*
ATTORNEYS

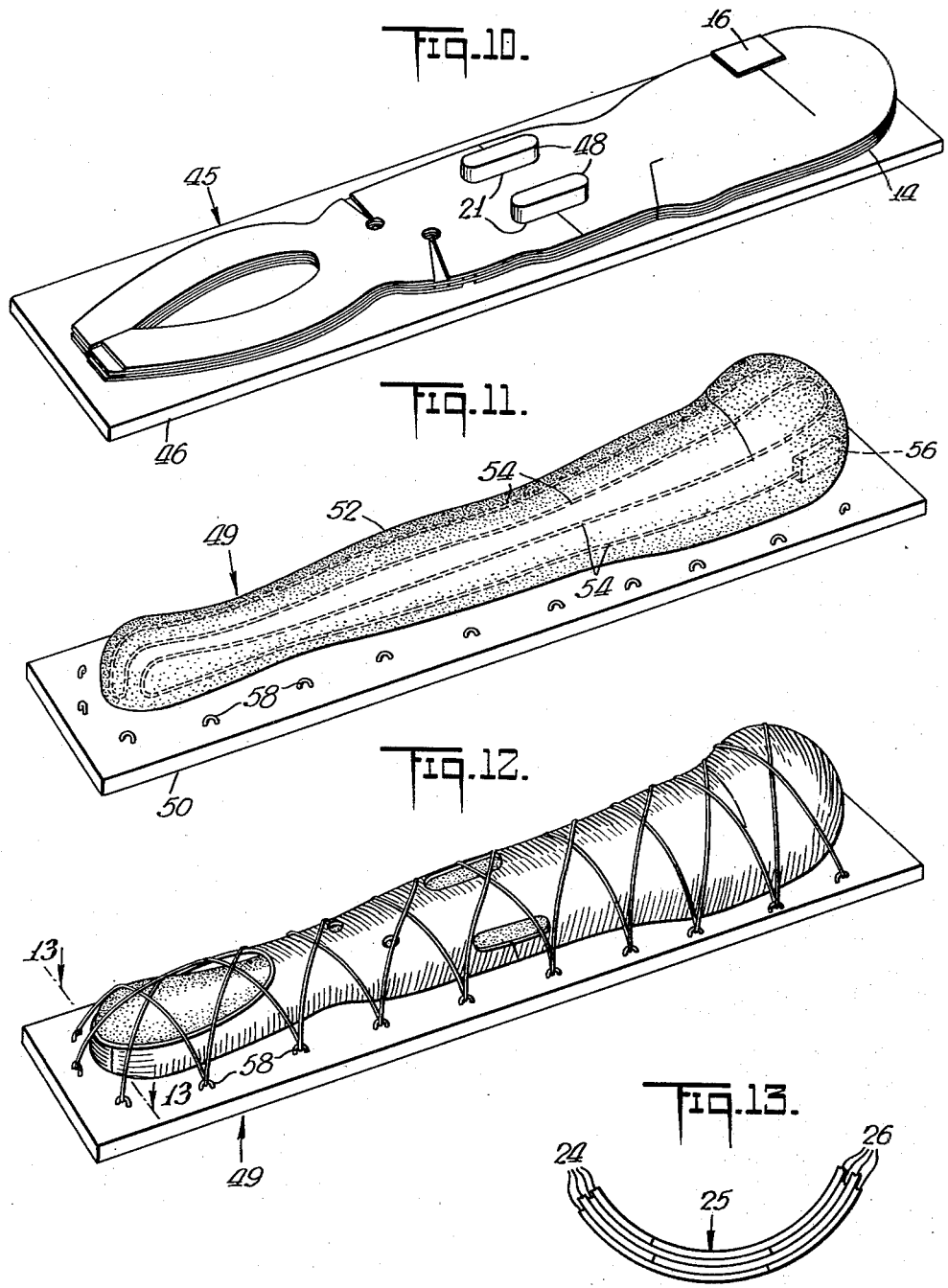

Feb. 26, 1946.   C. EAMES   2,395,468
METHOD OF MAKING LAMINATED ARTICLES
Filed May 28, 1942   5 Sheets-Sheet 5
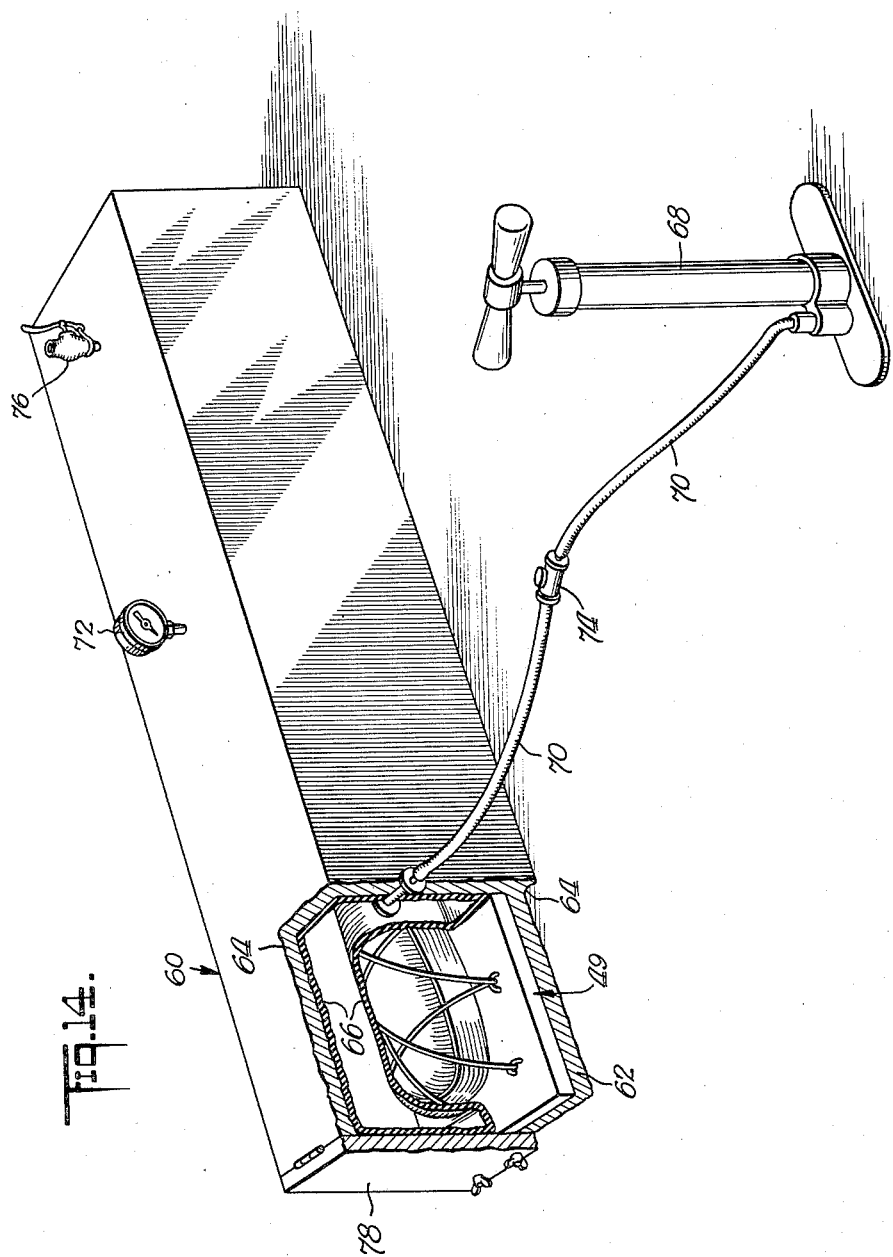
INVENTOR
Charles Eames
BY
Blair, Curtis + Hayward
ATTORNEYS Patented Feb. 26, 1946

2,395,468

UNITED STATES PATENT OFFICE 2,395,468

METHOD OF MAKING LAMINATED ARTICLES

Charles Eames, West Los Angeles, Calif., assignor to Evans Products Company, Detroit, Mich., a corporation of Delaware Application May 28, 1942, Serial No. 444,774

3 Claims. (Cl. 144—309)

This invention relates to methods of forming laminated articles, to apparatus for forming laminated articles, and to laminated articles themselves. More particularly it involves laminated articles having surfaces conforming to compound curves, along with the manner and means of providing such conformations. (Note: In the following, by a compoundly curved surface is meant a surface presenting a two dimensional curve, such as a spherically shaped surface, as distinguished from an unidimensional curve, such as a cylindrically shaped surface.)

An object of this invention is to provide a novel and improved method of molding laminated materials into shapes having compoundly curved surfaces by utilizing low molding pressures. Another object is to set forth novel and improved apparatus for fabricating shaped laminated sheets. A further object is to provide a novel and improved surgical splint. A still further object is to provide a novel and improved chair. Yet another object is the provision of a novel and improved stretcher. Additional objects will be in part obvious and in part pointed out as the description proceeds below.

One example of the laminated materials above referred to is plywood. Plywood has been used in varying thicknesses in furniture, boxes, houses, and certain other structures. In some instances it has been bent into curved configurations for use, for example, in the seats and backs of folding wooden chairs. Heretofore, the use of curved sheets of plywood has been limited primarily to articles wherein, at any point on the surface, one element of the surface was a straight line or, in other words, wherein the surface of the article conformed to a surface generated by a straight line moving along a curve. Recently it has become known that plywood could in some instances be molded to conform to a limited extent to more irregular, compoundly curved surfaces, such as those generated by a curved line moving through space along a curve. Such compound curves were achieved in sheets of plywood only through the use of expensive dies operating under relatively great pressures and then usually only with some sacrifice in the quality of the finish of the wood in the molded surfaces.

The present invention comprehends methods and means whereby compoundly curved surfaces in plywood articles are made possible without the use of high pressures or expensive dies and without deleterious effects on the wood surfaces. It includes methods and means whereby a laminated article may be fabricated conforming to a great variety of configurations and having almost any specified strength. As will appear, the materials required are easily obtained, highly skilled labor is not essential, and mass production is readily achieved.

The basic method of the invention stems from an appreciation inculcated through experience of the characteristics and possibilities of the materials that go together to make a sheet of plywood. A single sheet of veneer, properly cut from suitable wood, was highly flexible and easily distorted and it was discovered that, by cutting a small opening in a veneer and removing a dart extending from an edge of the veneer to the opening, the pliant sheet could easily be formed to give a compound surface (the precise shape depending upon the nature of the dart and the forces directed on the sheet) with the salient portion of the surface coextensive with the point of the dart and the opening. It was further discovered that a plurality of veneers, when properly cut, could easily be simultaneously shaped to give a compound surface, with each intermediate sheet creeping slightly with respect to the adjacent upper and lower sheets as the laminae were molded. By cutting the veneers so that no cut directly overlay an adjacent cut, by permanently bonding the veneers one to another after they had been individually shifted with respect to one another during the actual molding, and by combinations of openings and darts to give combinations of salient portions, it was finally discovered that a sheet of plywood could be formed over a range of thicknesses to almost any given compound configuration and without the application of excessive power.

The invention opens a new field for wood veneers, plies and other sheet material. Articles fabricated in accordance with the invention may be given the desired configurations through combinations of compoundly shaped portions, each one of which portions is more or less similar to a portion of the surface of a sphere. The resulting article has the advantage of possessing exceptional structural strength. Even as a plane-surfaced support is, theoretically, the least rigid type of structural support so, on the other hand, is a spherically shaped supporting structure the ideal rigid support because of the perfect force distribution which it provides. Each of the curved portions of an article made in accordance with the invention approaches a theoretically ideal spherically shaped structure with the result that the strength of the article as a whole approaches a maximum.

The discovery in its early stages dealt primarily with plywood and it will be illustrated here as it may be applied to plywood articles but it is not to be construed as limited to plywood or to sheet-like materials built up wholly from wood veneers. It may be practiced in the fabrication of other materials built up from a plurality of laminae. In so far as the invention is concerned it does not matter whether each of the laminae be of the same composition, thickness, or physical properties.

In the drawings, in which exemplary structures are illustrated for attaining the objectives set forth and in which like reference characters refer to like parts:

Figure 1 is a perspective view of a surgical splint embodying and made in accordance with the process of the invention;

Figure 2 is a plan view of a veneer for the splint showing the general pattern of the laminae from which the splint is fabricated;

Figure 3 is a perspective view of a chair embodying and made in accordance with the process of the invention;

Figure 4 is a plan view of a veneer for the chair showing the general pattern of the laminae from which the chair is fabricated;

Figure 5:
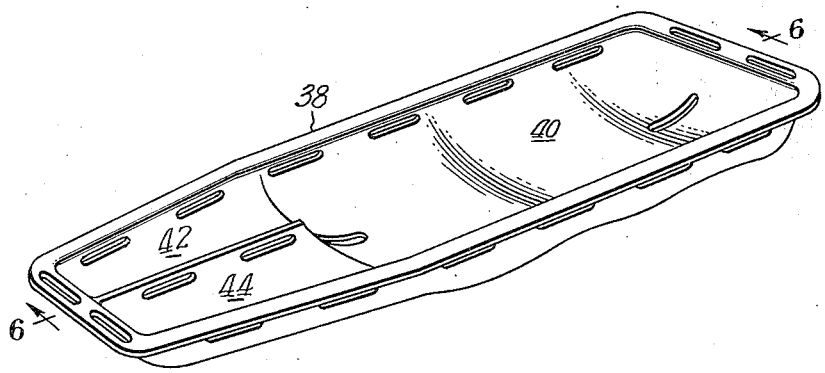
Figure 5 is a perspective view of a stretcher embodying and made in accordance with the process of the invention.
Figure 6:
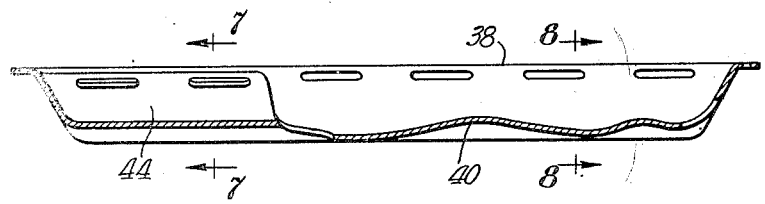
Figure 7:
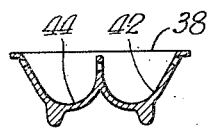
Figure 8:
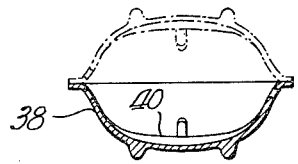

Figures 6, 7, and 8 are sectional views of the stretcher of Figure 5 taken in the direction of the arrows along lines 6—6, 7—7, and 8—8, respectively;

Figure 9 is a plan view of a reinforcing member;

Figure 10 is a perspective view of a series of splint veneers in registration with an aligning device;

Figure 11 is a perspective view of a die member for forming a splint in accordance with the invention;

Figure 12 is a perspective view of the veneers of Figure 10 applied to the die of Figure 11;

Figure 13 is an enlarged view of a detail of Figure 12 taken in the direction of the arrows along the line 13—13; and Figure 14 is a perspective view, with parts broken away and parts in section, of the veneers and die of Figure 12 located within a pressure chamber, in what might be termed a molding position, in accordance with the invention.

The splint

The splint, indicated by 12 (Figure 1), is fabricated from layers of wood veneer. The veneers are cut according to a pattern to form blanks, such as the blank 14 shown in Figure 2, and each blank is so cut from the veneer sheeting that the grain of the wood in each runs in a different direction. The blank 14 (Figure 2), is provided with cut-out portions as indicated by P. These portions are located and proportioned in relation to the location and configuration of the desired compoundly curved shapes of the finished article. Each portion P is adapted to provide a dome-like contour, the top of the dome corresponding generally to the location of an opening 20 and the character of the dome depending upon the shape of a dart-shaped part 22. If the height of the dome is to be slight, the dart removed is quite narrow at its broadest point; if the height of the dome is to be not so slight, the dart removed is wider at its base. In the form illustrated the dart-shaped parts removed have been given generally straight side lines. These lines may in some instances be arcuate or irregular, depending upon the shape of the surface desired. Some of the cut-out portions include specially formed openings 21 adapted to cooperate with an aligning device, to be described, to align the veneers in registration with one another, and are connected by cuts with the outer edges of the veneers as shown at 21a, Fig. 2.

For any given compoundly curved portion the dart in each veneer is angularly displaced somewhat with respect to the corresponding dart of the next adjacent veneer (as indicated in dotted lines by 23) so that, when the edges of a given dart are brought into juxtaposition during the molding to form a seam, no seam directly overlies another seam. The overlapping joint thus formed is substantially as strong as any other portion of the splint. Similarly, ends 24 and 26 of each veneer are cut to give an interlocking, overlapping joint, as at 25 (Figure 1), when they are combined during the molding to form stirrup 27 of the splint. For a detailed view of this type of joint see Figure 13. Dotted lines 18 and 19 indicate where portions 24 and 26 might be cut in alternate blanks to provide for joint 25. A patch 16 allows for expansion of the upper portion 17. The patch may be varied through the several layers to avoid bulkiness.

The splint illustrated combines strength with light weight in a member which will afford support, including traction, to an entire leg. The embodiment described has a weight of a scant 700 grams and a series of splints may be nested together for compact storage or easy transportation.

The chair

Figure 3 illustrates a molded plywood chair 28. The pattern 29 of the blanks used in making the chair appears in Figure 4 and shows how cut-out portions P may be combined. In this instance, three portions P have been combined to form a veneer which may be accurately shaped to conform to the contours of a person who is to occupy the chair. Sections 30 and 32 of the blanks, for a given chair, would be displaced somewhat with respect to one another, as shown in dotted lines, so that they would interfit to make a solid frame over the top of the chair back, with the opposing edges of sections 30 and 32 of any one veneer coming together in off-set relationship to that of the corresponding sections of adjacent veneers to provide a strong, smooth joint, as at 31 (Figure 3).

The chair is very light in weight and at the same time, because of the almost unlimited configurations to which such chairs may be conformed, it gives the maximum comfort and freedom for movement necessary to use in such locations as, for example, in aeroplanes.

The stretcher

The stretcher, shown in Figures 5, 6, 7, and 8 and indicated generally by numeral 38, is another example of a novel, improved product made in accordance with the invention. It may be fabricated from veneers cut in accordance with a pattern. A fitted body section 40 and fitted leg sections 42 and 44 are all made possible through the skillful location and combination of cut-out portions in the blanks.

The stretcher is strong, light in weight, and, because of its scientificaly proportior d surfaces, provides proper support for each member of the body without additional pads, rubber sheets, and the like, previously necessary in the field with known stretchers, and any number of them may be nested together with the result that they enable economies in space and one man can carry a number of them. Furthermore, the stretcher is waterproof and can float while bearing a man. It acts as a complete splint in itself to immobilize any part of the body, conserves body heat, and, when covered by a second, inverted stretcher (as indicated by dotted lines in Figure 8) serves to keep out rain, snow or insects and affords protection generally from exposure and from the rough handling which inevitably accompanies movements such as from one ship to another or through heavy underbrush.

The reinforcement

Figure 9 depicts a means for strengthening an isolated section of an article made in the practice of the invention. Piece 36 is adapted to be inserted between layers of an article to be reinforced. Holes, such as indicated at 16, extend through all the laminae of the portion strengthened, as well as through piece 36, and serve to cooperate with an aligning device, to be described, to maintain piece 36 in position during the formation of the article.

The strength of an article may be increased over a desired area by the insertion of reinforcing pieces such as piece 36. The reinforcements may occur in a compound surface, in which event they may include cut-out portions such as P (Figure 2) so that they may be easily shaped along with the other laminae. Several reinforcements may be inserted over the same area and they may even be used to give slight changes in the contour of the surface of the article. Best results are obtained by tapering the edge portions of the reinforcing piece so that the adjacent laminae may flow smoothly over the piece.

The aligning device

Figure 10 illustrates an aligning device 45 consisting of a base plate 46 carrying pins 48. The pins are arranged to conform to the location of specially shaped openings in the blanks to be aligned. By way of example the device is shown aligning the specially shaped openings 21 of the splint blanks 14. It may be used with other blanks, however, or in connection with reinforcing pieces. The blanks may be assembled by slipping them over pins 48 and onto the base plate 46, which supports them in registration with each other while enough blanks are being assembled into a sheaf to form a splint.

The die member

Figure 11 represents a die member 49 consisting of a base 50, a die portion 52, an electric heating element 54 and a conventional thermal control 56. The die member may be made of concrete, for example, since it is not required to withstand great pressure or heat. For the purposes of illustration the die portion 52 shown is the one used to form a splint. Embedded in base 50 and closely surrounding die portion 52 is a plurality of U-shaped members 58, for a purpose to be described.

The pressure chamber

Figure 14 shows a pressure chamber 60 consisting of a die bed 62 for supporting interchangeable dies, a housing 64, a rubber bladder or diaphragm 66, and, by way of illustration, the die member 49 for the splint resting on the die bed. An air pump 68 is connected by a conduit 70 to the interior of the bladder. The numeral 72 indicates an air gauge, 74 indicates a one-way check valve, 76 indicates a relief valve and 78 indicates a door to the pressure chamber.

In operation, a die member carrying a sheaf of blanks to be molded is placed on die bed 62 underlying bladder 66, and door 78 is closed and locked. By pumping air into the bladder, the sheaf of blanks may be brought into accurate conformation with the matrix presented by the die member. Simultaneously, the article being processed may be heated under the control of the thermostat associated with the heating element of the die member.

The process

The process of the invention comprises a series of relatively simple steps. Success is achieved in a practicable manner which does not require expensive equipment or high pressures or temperatures.

A pattern is planned in accordance with the article to be produced. Portions of it are cut out in relation to the curved surfaces desired. By way of illustration, reference is made to the splint illustrated in Figure 1, the pattern for which is shown by the blank in Figure 2. Blanks are cut from a veneer sheet in such a manner that the grain in each blank runs in a different direction. The various blanks of a given splint display the further differences necessary for the location of the cut out portions and the tab portions which will comprise the overlapping joints. The blanks should preferably be designed so that no one seam will directly overlie another seam.

A thermo-setting, phenolic resin binder material is applied to the blanks and the blanks are placed in registration with one another, as, for example, with the aid of an aligning device such as illustrated in Figure 10. The sheaf of registering blanks is then applied to a die, as illustrated in Figure 12, by binding the laminae of the sheaf into conformation with the configurations of the die matrix and by assuring that the edges of the joint portions are properly interfitted. The U-shaped members 58 of die member 49 aid in the binding procedure.

The die member carrying the sheaf of blanks is put into a pressure chamber, such as illustrated in Figure 14. The thermal control of the heating element in the die member is set for about 165° C., the door of the pressure chamber is closed, air at a pressure of about 30 pounds per square inch is pumped into the bladder and the whole is left for about an hour, during which time the thermo-setting binder is permanently fixed to cement the laminae together. Thereafter the finished article is removed.

None of the equipment involved is complicated. The specially cut blanks of the invention lend themselves peculiarly well to being molded so that only a low pressure is required to make the laminae conform to the die while the binder is setting. The old concept of male and female die surfaces is eliminated entirely and the one die that remains is not subjected to hard wear and hence can be made, for example, of cast concrete. The low pressure used has the further advantage of eliminating the impaired exterior surfaces heretofore accompanying the attempts made at molding compoundly curved surfaces in plywood articles.

Since many embodiments of the invention are possible and since many changes might be made in the embodiments set forth, protection is not to be limited to anything described or presented in the above specification and drawings but only to the scope of the hereinafter attached claims.

I claim:

1. In the art of fabricating a laminated article having compound curved surfaces the steps of preparing a plurality of blanks, removing from the blanks predetermined portions related to areas to be subsequently shaped into compound curves, removing from the blanks portions to provide in each blank a plurality of registry openings, connecting each of said openings with the outer edges of its blanks by cuts in the blank, treating the surfaces of the blanks with a cement moldable when subjected to pressure and elevated temperature, stacking the blanks in a sheaf, positively aligning the blanks by holding said registry openings in alignment, placing said sheaf thus registered in juxtaposition to a matrix, conforming the sheaf generally to the matrix, and subjecting the sheaf to pressure and temperature while on said matrix to give the sheaf the desired shape and to cause the cement to flow and bind the blanks together and hold the said shape.

2. In the art of fabricating a laminated article having compound curved surfaces the steps of preparing a plurality of blanks, removing from the blanks predetermined portions related to areas to be subsequently shaped into compound curves, removing from the blanks portions to provide in each blank a plurality of registry openings, connecting each of said openings with the outer edges of its blanks by cuts in the blank, removing from the blanks predetermined dart-shaped portions related to areas to be subsequently shaped into compound curves, angularly offsetting each dart-shaped portion with respect to the corresponding dart-shaped portion of any adjacent blank whereby no one dart-shaped portion directly overlies any other dart-shaped portion, treating the surfaces of the blanks with a cement moldable when subjected to pressure and elevated temperature, stacking the blanks in a sheaf, positively aligning the blanks by holding said registry openings in alignment, placing said sheaf thus registered in juxtaposition to a matrix, conforming the sheaf generally to the matrix, and subjecting the sheaf to pressure and temperature while on said matrix to give the sheaf the desired shape and to cause the cement to flow and bind the blanks together and hold the said shape.

3. In the art of fabricating a laminated article having compound curved surfaces the steps of preparing a plurality of blanks, removing from the blanks predetermined portions related to areas to be subsequently shaped into compound curves to provide openings in the blanks and locating said openings in such manner that they register one with the other in a subsequent stacking and conforming operation, whereby edges of said openings may be used for registering purposes, removing from the blanks predetermined dart-shaped portions related to areas to be subsequently shaped into compound curves, angularly offsetting each dart-shaped portion with respect to the corresponding dart-shaped portion of any adjacent blank whereby no one dart-shaped portion directly overlies any other dart-shaped portion, treating the surfaces of the blanks with a cement moldable when subjected to pressure and elevated temperature, stacking the blanks in a sheaf, positively aligning the blanks by holding said edges in alignment, placing said sheaf thus registered in juxtaposition to a matrix, conforming the sheaf generally to the matrix, and subjecting the sheaf to pressure and temperature while on said matrix to give the sheaf the desired shape and to cause the cement to flow and bind the blanks together to hold the said shape.

CHARLES EAMES.